Jan. 19, 1937.  S. JENCICK  2,068,604
INDEPENDENTLY ACTING WHEEL SUSPENSION FOR AUTOMOBILES
Filed July 19, 1934  3 Sheets—Sheet 1

INVENTOR.
STEPHEN JENCICK.
BY Milburn and Milburn
ATTORNEYS.

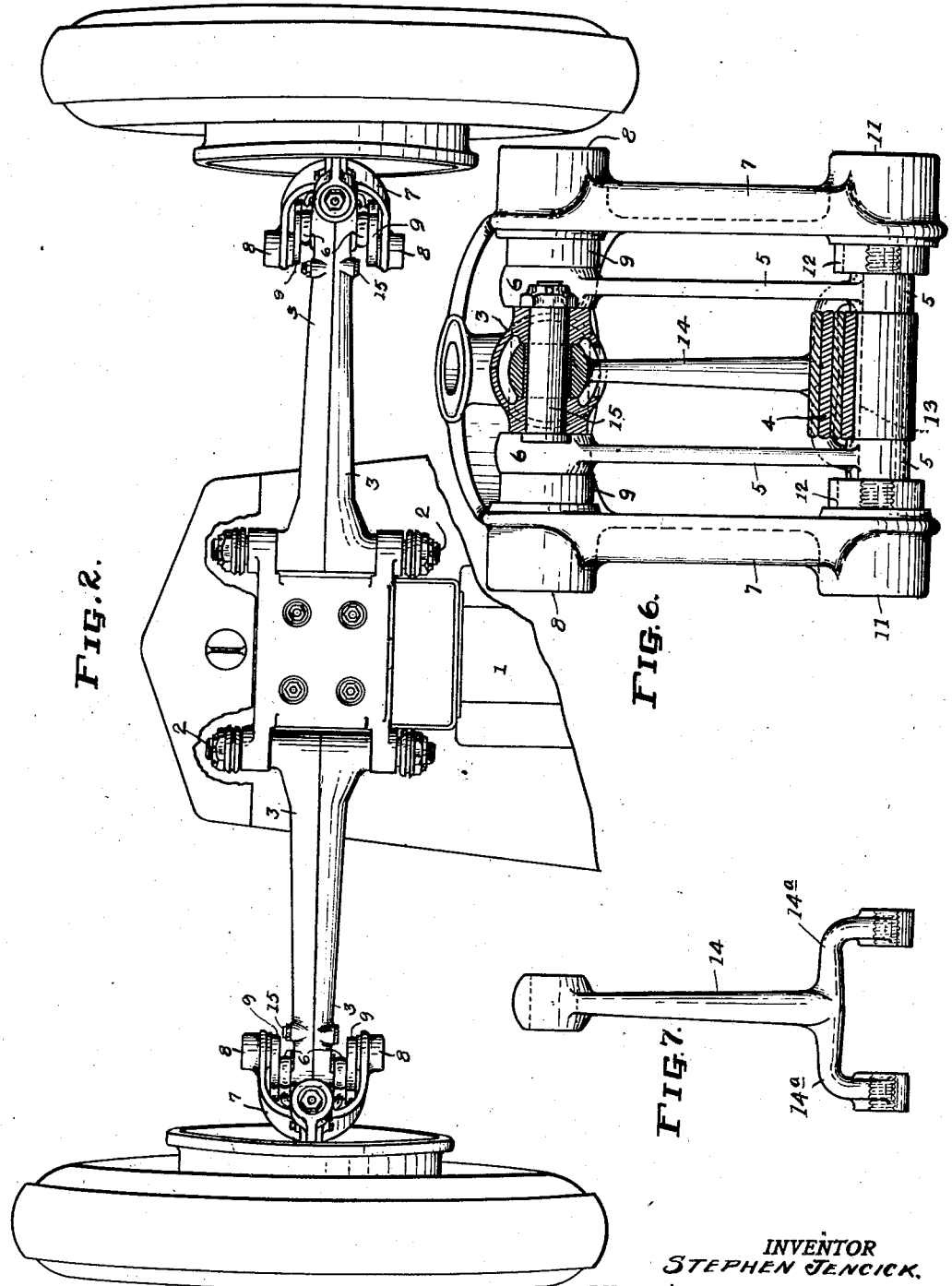

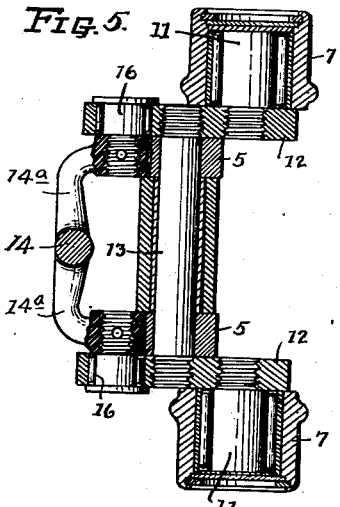
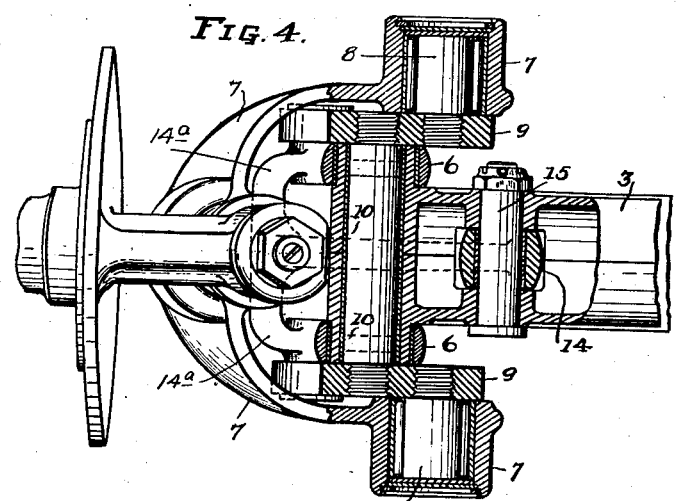
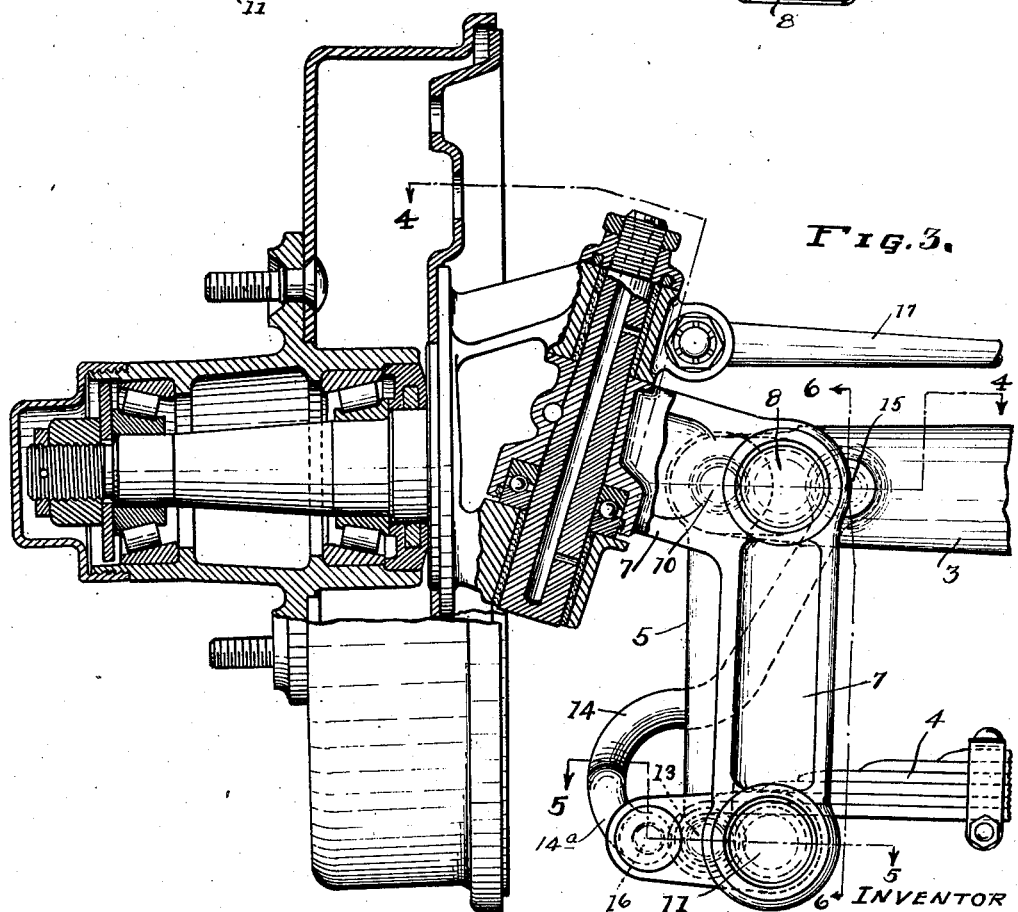

Patented Jan. 19, 1937

2,068,604

UNITED STATES PATENT OFFICE 2,068,604

INDEPENDENTLY ACTING WHEEL SUSPENSION FOR AUTOMOBILES

Stephen Jencick, Chagrin Falls, Ohio, assignor to Thompson Products, Inc., Cleveland, Ohio, a corporation Application July 19, 1934, Serial No. 736,050

10 Claims. (Cl. 267—19)

This invention relates to independently acting wheel-suspension devices for automobiles.

Certain automobiles are now being equipped with devices which are intended to afford independent or individual action of each wheel as it encounters rough places in the roadway, these devices being heretofore provided only upon the front wheels.

All of these prior devices, so far as I am aware, cause a transverse movement of the wheels on the road, with the result that the treads of the tires are subjected to considerably increased wear.

The object of my invention is to provide an individually acting wheel-suspension means which is capable of a highly efficient operation and which maintains the wheels in the same vertical plane at all times during such automatic adjustment.

Another object consists in devising such a mechanism which is of dependable construction in both durability and operation.

Other objects will appear from the following description and claims when considered together with the accompanying drawings.

Fig. 2 is a plan view thereof;

Fig. 3 is an enlarged view of a part of Fig. 1 with parts in section;

Figure 1:
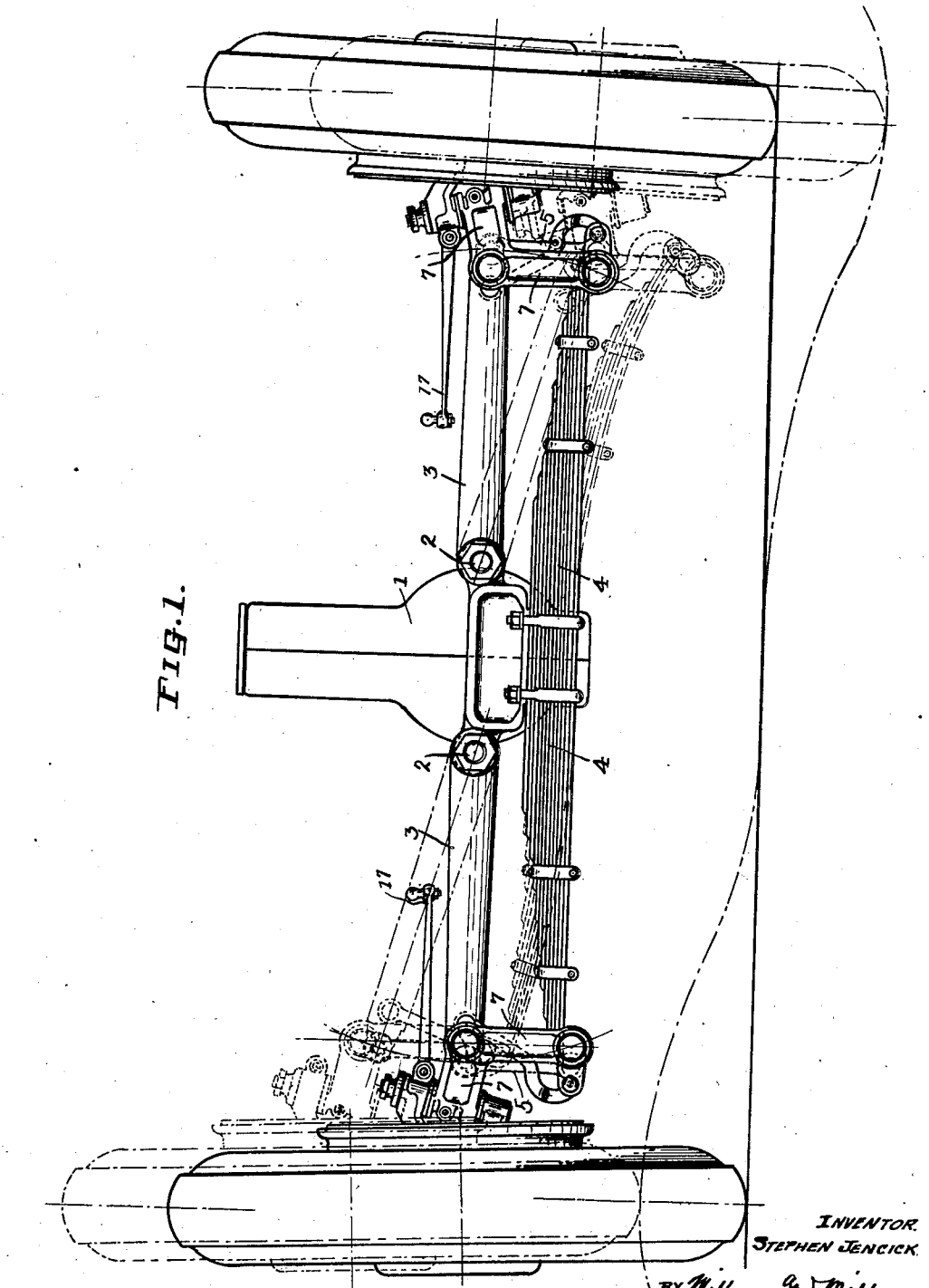
Fig. 1 is a front elevation of the front part of an automobile with my invention applied thereto.

Figs. 4, 5, and 6 are detail views taken on lines 4—4, 5—5, and 6—6, respectively, of Fig. 3; and Fig. 7 shows one of the forked links that form a part of my mechanism.

Although this invention is shown only in connection with the front wheels of an automobile, yet the same device can be used in connection with the rear wheels as well and in the same manner, as will more fully appear.

The chassis is indicated in a general way by reference numeral 1 and it has pivotally connected at 2 upon the opposite sides thereof the laterally extending supporting arms 3. These arms 3 may be of any suitable form and construction and may well be constructed in hollow form after the manner disclosed in my co-pending application executed of even date herewith and bearing Serial No. 736,051 and filing date of July 19, 1934.

Mounted upon the end of the chassis 1 is the multiple leaf spring 4 which extends laterally immediately beneath the arms 3. This is the main spring of the front end of the automobile and is the only spring required with my invention.

The outer ends of the arms 3 and spring 4, in each case, are directly one above the other, and they are connected at their ends by the links 5 which have their ends pivotally connected thereto. These links 5 are in pairs and their ends are pivotally mounted at 6 about the hub portions provided upon the end of arm 3.

The angular bracket 7 upon which the wheel is mounted in each case is pivotally mounted at 8 upon the ends of the short links 9 which have their other ends mounted upon the journal pin 10 in the end of arm 3.

The lower end of the bracket 7 is pivotally connected to the pins 11 in the ends of the links 12 which are mounted upon the journal pin 13 which in turn is mounted upon the end of spring 4. The links 5 have their lower ends journaled about the pin 13, as indicated in Fig. 5.

There is also a link 14 which is pivotally connected at its upper end to the pin 15 provided in the arm 3 which have openings through which the link 14 may extend. The lower end of link 14 is bifurcated, as indicated at 14ª, and is connected to journal members 16 which are pivotally mounted in the other ends of the links 12.

It will be observed that when the wheels and the parts of the mechanism are in normal position, the points 10, 8, and 15 are in substantially horizontal alignment, and the same thing is true of the points 11, 13, and 16.

The steering connection is indicated in a general way by reference numeral 17, and it has suitably arranged universal joint connections.

When one of the wheels encounters an unevenness in the roadway, its movement up or down will be accompanied by a corresponding automatic adjustment of the suspension means of that particular wheel but without affecting the condition of the other wheels or their mechanisms.

For instance, referring to Fig. 1, when one of the wheels encounters a high place in the road, the support 3 and the corresponding part of the spring 4 will be automatically deflected upwardly, as indicated by dotted lines in the left-hand part of Fig. 1. The arm 3 turns about the pivot point 2 and the left-hand part of the spring is deflected from its middle point where it is in clamped condition. During such deflection of the arm 3 and spring 4, they are maintained in substantially parallel relation.

As the wheel assumes elevated position, the links 9 turn counter-clockwise about their axis 10 and at the same time the links 12 also turn counter-clockwise about their axis 13. Thus, the pivot point 8 of the bracket 7 is moved upwardly and outwardly and virtually the radial length of the arm 3 is thereby increased accordingly so that the wheel may continue to occupy the same vertical plane regardless of the elevated position of the wheel. The parts of this mechanism are so constructed and designed that this condition with respect to the plane of the wheel will be maintained at all times.

The link 5 and the vertically disposed parts of the brackets 7, and the links 9 and 12 might be regarded as constituting a parallelogram which is collapsed more or less in one manner or the other as the wheel encounters a raised or lowered portion in the roadway.

Then when the wheel returns to normally even road surface, the parts just referred to will return in reverse manner to their normal condition, as indicated in full lines in Fig. 1.

In the right hand part of Fig. 1, there is illustrated the action of my self-adjusting mechanism when the wheel encounters a depression in the roadway. Here it will be seen that the arm 3 and the corresponding part of the spring 4 will be deflected downwardly about the point 2 and the middle point of the spring as centers. At the same time the links 9 and 12 are turned counterclockwise about their axes, the pivot point 8 of bracket 7 being moved downwardly and outwardly so as to virtually extend the radial length of the arm 3 and thereby maintain the wheel in substantially the same vertical plane.

Then when this wheel again encounters even road surface, there will be the reverse automatic adjustment of the mechanism just referred to and the arm 3 and spring 4 will return to normal position as indicated in full lines in Fig. 1.

Although it is hardly likely that the conditions indicated in dotted lines for the two wheels in Fig. 1 will be experienced at the same time in the ordinary course of events, yet the showing in Fig. 1 is merely for the purpose of illustrating how my device can operate under even extremely abnormal conditions. The mechanism for each wheel at all times acts independently of the condition of any other wheel.

In order to adopt this invention for the rear wheels, this can be accomplished by means of the same combination and arrangement of mechanism including the pivotally adjustable arms 3, the leaf spring 4 extending therebeneath, and the links and levers between the wheel bracket and the ends of the arm and spring. In the case of the rear wheels, it becomes necessary to provide suitable joints in the rear axles at points near their inner and outer ends corresponding to the pivotal adjustments at the two ends of each arm 3.

My device does not involve the use of any spring except the leaf spring 4 which might be recognized as a familiar form of main leaf spring of the automobile. As clearly seen from the drawings, the one spring serves the same purpose with both of the opposite wheels.

With my device, the up and down movement of the wheels as they travel over irregular portions of the roadway, is confined to the wheels themselves and their automatic control mechanism. Thus, this up and down movement of the wheels is not transmitted to the body of the automobile but the body at all times maintains its normal elevation, with the resulting increased comfort to the occupants and reduced strain upon the automobile body.

As above stated, another advantage resides in the fact that with my particular mechanism each wheel always occupies the same vertical plane, regardless of the condition of the road. Thus the width of the tread remains a constant and there results also a decided saving in the wear upon the tires, as well as other attendant advantages which will be obvious to those who are familiar with the art to which the present invention relates.

What I claim is:

1. In an automobile, the combination of a chassis including a pair of oppositely and laterally disposed arms with adjustable connections therefor permitting individual pivotal movement of the arms in a vertical plane, means for mounting a wheel upon the end of each arm, spring means mounted upon the chassis and being effective at points beneath the wheel mountings, and individually adjustable parallelogram connections between each wheel mounting and the corresponding arm and spring means.

2. In an automobile, the combination of a chassis including a pair of oppositely and laterally disposed arms with adjustable connections therefor permitting individual pivotal movement of the arms in a vertical plane, means for mounting a wheel upon the end of each arm, spring means mounted upon the chassis and being effective at points beneath the wheel mountings, and individually adjustable parallelogram connections between each wheel mounting and the corresponding arm and spring means, one main link of the parallelogram in each case connecting the ends of the arm and spring means, and the other main link of the parallelogram being a continuation of a part of said means for mounting the corresponding wheel.

3. In an automobile, the combination of a chassis including a pair of oppositely and laterally disposed arms with adjustable connections therefor permitting individual pivotal movement of the arms in a vertical plane, means for mounting a wheel upon the end of each arm, spring means mounted upon the chassis and being effective at points beneath the wheel mountings, and individually adjustable parallelogram connections between each wheel mounting and the corresponding arm and spring means, an auxiliary link of the parallelogram being pivotally mounted upon the end of said spring means, a main link of the parallelogram having its one end connected to one end of said auxiliary link and forming a continuation of a part of the wheel mounting means, and the other main link of the parallelogram being connected at its one end to the pivot point of said auxiliary link and at its other end to the end of said arm.

4. In an automobile, the combination of a chassis including a pair of oppositely and laterally disposed arms with adjustable connections therefore permitting individual pivotal movement of the arms in a vertical plane, means for mounting a wheel upon the end of each arm, spring means mounted upon the chassis and being effective at points beneath the wheel mountings, said wheel mounting means in each case comprising an angular shaped bracket and an auxiliary link by which said bracket is pivotally connected at its angle to the end of the corresponding arm so as to form one of the main links of the parallelogram, a second auxiliary link pivotally mounted at the end of said spring means and having one end thereof pivotally connected to the lower end of said main link, and a companion main link pivotally connected at its ends to the pivot points of said auxiliary links.

5. In an automobile, the combination of a chassis including a pair of oppositely and laterally disposed arms with adjustable connections therefor permitting individual pivotal movement of the arms in a vertical plane, means for mounting a wheel upon the end of each arm, spring means mounted upon the chassis and being effective at points beneath the wheel mountings, said wheel mounting means in each case comprising an angular shaped bracket and an auxiliary link by which said bracket is pivotally connected at its angle to the end of the corresponding arm so as to form one of the main links of the parallelogram, a second auxiliary link pivotally mounted midway thereof at the end of said spring means and having one end thereof pivotally connected to the lower end of said main link, a companion main link pivotally connected at its ends to the pivot points of said auxiliary links, and an additional link pivotally connected at its one end to the other end of said second auxiliary link and at its other end to said arm.

6. In an automobile, the combination of a chassis including a pair of oppositely and laterally disposed arms with adjustable connections therefor permitting individual pivotal movement of the arms in a vertical plane, means for mounting a wheel upon the end of each arm, a single spring mounted at its middle upon the chassis and extending transversely thereof and having its free ends located beneath the wheel mountings, link means extending between and being pivotally connected to the corresponding ends of the arms and spring, and individually adjustable connections between each wheel mounting and the corresponding arm and spring end, whereby each arm and its corresponding portion of the spring will occupy always substantially the same relative position.

7. In an automobile, the combination of a chassis including a pair of oppositely and laterally disposed arms with adjustable connections therefor permitting individual pivotal movement of the arms in a vertical plane, means for mounting a wheel upon the end of each arm, a single spring mounted at its middle upon the chassis and extending transversely thereof and having its free ends located beneath the wheel mountings, link means extending between and being pivotally connected to the corresponding ends of the arms and spring, and invididually adjustable connections between each wheel mounting and the corresponding arm and spring end, said adjustable connections including means for virtually varying the radius of the arm so as to always maintain the wheel in the same vertical plane.

8. In an automobile, the combination of a chassis including a pair of oppositely and laterally disposed arms with adjustable connections therefor permitting individual pivotal movement of the arms in a vertical plane, individually adjustable connections between each wheel and the end of the corresponding arm, said connections including means for virtually varying the radius of the arm so as to always maintain the wheel in the same vertical plane, and spring means for returning the wheel and its adjustable connections to normal position.

9. In an automobile, the combination of a chassis including a pair of oppositely and laterally disposed arms with adjustable connections therefor permitting individual pivotal movement of the arms in a vertical plane, means for mounting a wheel upon the end of each arm, spring means mounted upon the chassis and being effective at points beneath the wheel mountings, and individually adjustable connections between each wheel mounting and the corresponding arm and spring means for preventing deflection of the wheel from its normal vertical plane while permitting individual up and down movement of each wheel independently of the other.

10. In an automobile, the combination of a chassis including a pair of oppositely and laterally disposed arms with adjustable connections therefor permitting individual pivotal movement of the arms in a vertical plane, means for mounting a wheel upon the end of each arm, a single spring means extending transversely of the chassis and substantially parallel with said arms and having the ends thereof located beneath the wheel mountings, and individually adjustable connections between each wheel mounting and the corresponding arm and spring end for automatically compensating for pivotal movement of the arms and springs so as to maintain each wheel in its respective vertical plane.

STEPHEN JENCICK.